(12) United States Patent
Carr et al.

(10) Patent No.: US 12,031,767 B2
(45) Date of Patent: Jul. 9, 2024

(54) FREE-STANDING ICE OR BEVERAGE DISPENSING APPLIANCE

(71) Applicant: Haier US Appliance Solutions, Inc., Wilmington, DE (US)

(72) Inventors: Gregory Scott Carr, Louisville, KY (US); Danister Abeygunawardana, Jeffersonville, IN (US); Ronald Gary Foster, Louisville, KY (US); Jordan Andrew Waymeyer, Louisville, KY (US); Timothy Ray Jackson, Louisville, KY (US); David C. McCalpin, Louisville, KY (US); Brent Alden Junge, Evansville, IN (US); Richard Devos, Goshen, KY (US); Michael C. Watanabe, Louisville, KY (US); Jianwu Li, Louisville, KY (US); Trent Daniel Jacobi, Floyds Knobs, IN (US); Paul Haney, Pewee Valley, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 784 days.

(21) Appl. No.: 17/145,704

(22) Filed: Jan. 11, 2021

(65) Prior Publication Data
US 2022/0221212 A1    Jul. 14, 2022

(51) Int. Cl.
*F25C 5/20* (2018.01)
*A47J 31/46* (2006.01)
(Continued)

(52) U.S. Cl.
CPC ............. *F25C 5/24* (2018.01); *A47J 31/462* (2013.01); *B67D 1/0014* (2013.01); *B67D 1/004* (2013.01);
(Continued)

(58) Field of Classification Search
CPC ..... A47J 31/462; B67D 1/0014; B67D 1/004; B67D 1/0058; B67D 1/0888; B67D 1/0895; F25C 2400/14
(Continued)

(56) References Cited

U.S. PATENT DOCUMENTS 3,634,107 A * 1/1972 Cornelius ............... A47J 31/40
                                                     99/275
8,302,412 B2 * 11/2012 Tieleman ............. C02F 3/1263
                                                     62/272
(Continued)

FOREIGN PATENT DOCUMENTS

| JP | 2013/057488 A | 3/2013 |
| KR | 2014/0013732 A | 2/2014 |
| KR | 2017/0000272 A | 1/2017 |

*Primary Examiner* — Omar Flores Sanchez
(74) *Attorney, Agent, or Firm* — Dority & Manning, P.A.

(57) ABSTRACT

A free-standing appliance may include a cabinet, a water source, an icemaker, an ice bin, a cold water line, and one or more other features. The icemaker may be mounted within the cabinet downstream from the water source to receive water therefrom. The ice bin may be disposed within the cabinet downstream from the icemaker to receive ice therefrom. The cold water line may be mounted to the cabinet and define a cold water outlet downstream from the water source in fluid isolation from the icemaker.

20 Claims, 8 Drawing Sheets

(51) Int. Cl.
*B67D 1/00* (2006.01)
*B67D 1/08* (2006.01)

(52) U.S. Cl.
CPC ......... *B67D 1/0058* (2013.01); *B67D 1/0888* (2013.01); *B67D 1/0895* (2013.01); *F25C 2400/14* (2013.01)

(58) Field of Classification Search
USPC .......................................................... 99/290
See application file for complete search history.

(56) References Cited

U.S. PATENT DOCUMENTS

| | | | |
|---|---|---|---|
| 9,346,659 B2* | 5/2016 | Brown | B67D 1/0888 |
| 9,643,828 B2* | 5/2017 | Brown | B67D 1/0888 |
| 2003/0101735 A1* | 6/2003 | Teague | B67D 1/0021 |
| | | | 62/70 |
| 2019/0059633 A1* | 2/2019 | Bhutani | B67D 1/0068 |
| 2019/0161336 A1* | 5/2019 | Knoll | B67D 1/0888 |
| 2020/0122994 A1* | 4/2020 | Cimatti | G06Q 20/145 |
| 2021/0380391 A1* | 12/2021 | Defazio | B67D 1/0006 |
| 2022/0024748 A1* | 1/2022 | Fantappie | B67D 1/0058 |

* cited by examiner

FREE-STANDING ICE OR BEVERAGE DISPENSING APPLIANCE

FIELD OF THE INVENTION

The present subject matter relates generally to ice and beverage dispensers, and more particularly to non-plumbed dispensing assemblies.

BACKGROUND OF THE INVENTION

In home, restaurant, and office settings, it is common for multiple individual users to enjoy a wide variety of beverages. Such beverages may be hot or cold, flat or carbonated, flavored or unflavored, etc. For instance, coffee, tea, soft-drinks, vitamin/electrolyte drinks, purified chilled water, or hot water may all be desirable at various points in time. Currently, each type of beverage must be obtained from a different machine. At most, existing appliances permit one or two similar beverages (e.g., coffee and tea) to be generated at the same machine. If ice is desired, an entirely separate appliance (e.g., a dedicated icemaker or refrigerator) is often required. Moreover, typical existing appliances must be hard plumbed such that water is supplied from a connected water source, such as a municipal water system or well.

Such existing appliances present a number of drawbacks. For one, the number of machines required to prepare more than one or two beverages, let alone ice, is often prohibitive. Smaller offices or kitchens simply cannot dedicate space solely for the purpose of making a single beverage. In addition, having separate dispensing machines for each type of beverage can require a user to move between appliances in order to dispense different types of beverages or ice. This is inconvenient, providing for wasted time and effort. Separate appliances also lead to additional problems, such as more service calls, increased preventative maintenance and calibration and the need to store and have available extra spares parts. Furthermore, existing appliances often require large amounts of energy and assembled parts, even for relatively "basic" functions like chilling water. The need to hard plumb some appliances further limits their usability or mounting location.

As a result, it would be useful to provide an appliance having features for addressing one or more of the above-identified issues. In particular, it may be advantageous to provide an improved appliance for dispensing multiple types of beverages (e.g., with ice). Additionally or alternatively, it may be advantageous to provide an efficient free-standing appliance that does not need to be directly plumbed to a separate water source.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a free-standing appliance is provided. The free-standing appliance may include a cabinet, a water source, an icemaker, an ice bin, a cold water line, a hot water line, and a carbonated water line. The icemaker may be mounted within the cabinet downstream from the water source to receive water therefrom. The ice bin may be disposed within the cabinet downstream from the icemaker to receive ice therefrom. The cold water line may be mounted to the cabinet and define a cold water outlet downstream from the water source in fluid isolation from the icemaker. The hot water line may be mounted to the cabinet and defining a cold water outlet downstream from the water source in fluid isolation from the cold water line. A carbonated water line mounted to the cabinet downstream from the water source in fluid isolation from the hot water line.

In another exemplary aspect of the present disclosure, a free-standing appliance is provided. The free-standing appliance may include a cabinet, a water tank, an icemaker, an ice bin, a cold water line, and a cooling jacket. The water tank may be disposed within the cabinet. The icemaker may be mounted within the cabinet downstream from the water tank to receive water therefrom. The ice bin may be disposed within the cabinet downstream from the icemaker to receive ice therefrom. The cold water line may be mounted to the cabinet and define a cold water outlet downstream from the water tank in fluid isolation from the icemaker. The cooling jacket may be mounted along the ice bin in conductive thermal communication therewith. The cooling jacket may be upstream from the cold water outlet to cool water thereto.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
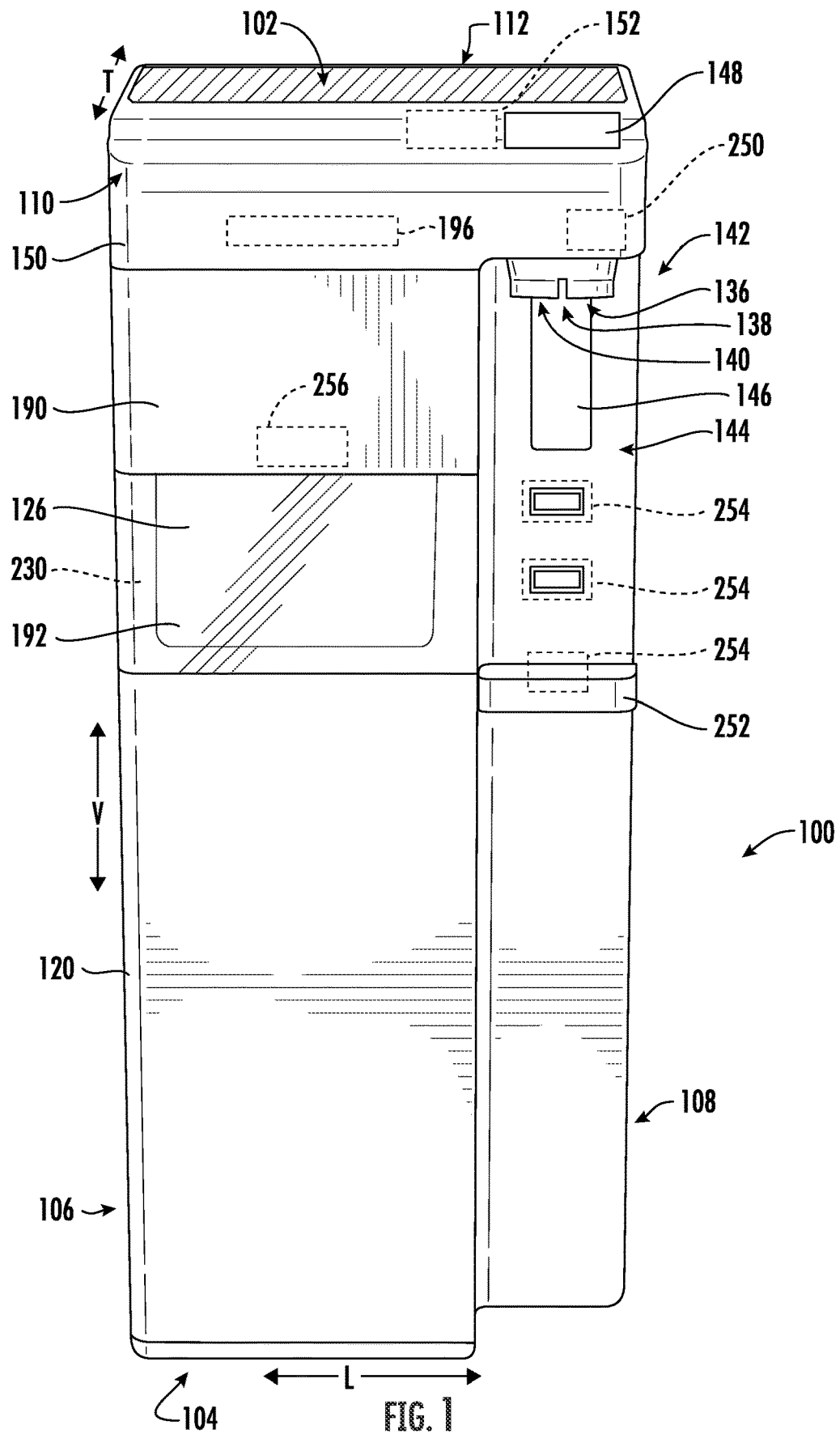
FIG. 1 provides a front perspective view of a free-standing appliance according to exemplary embodiments of the present disclosure.
Figure 2:
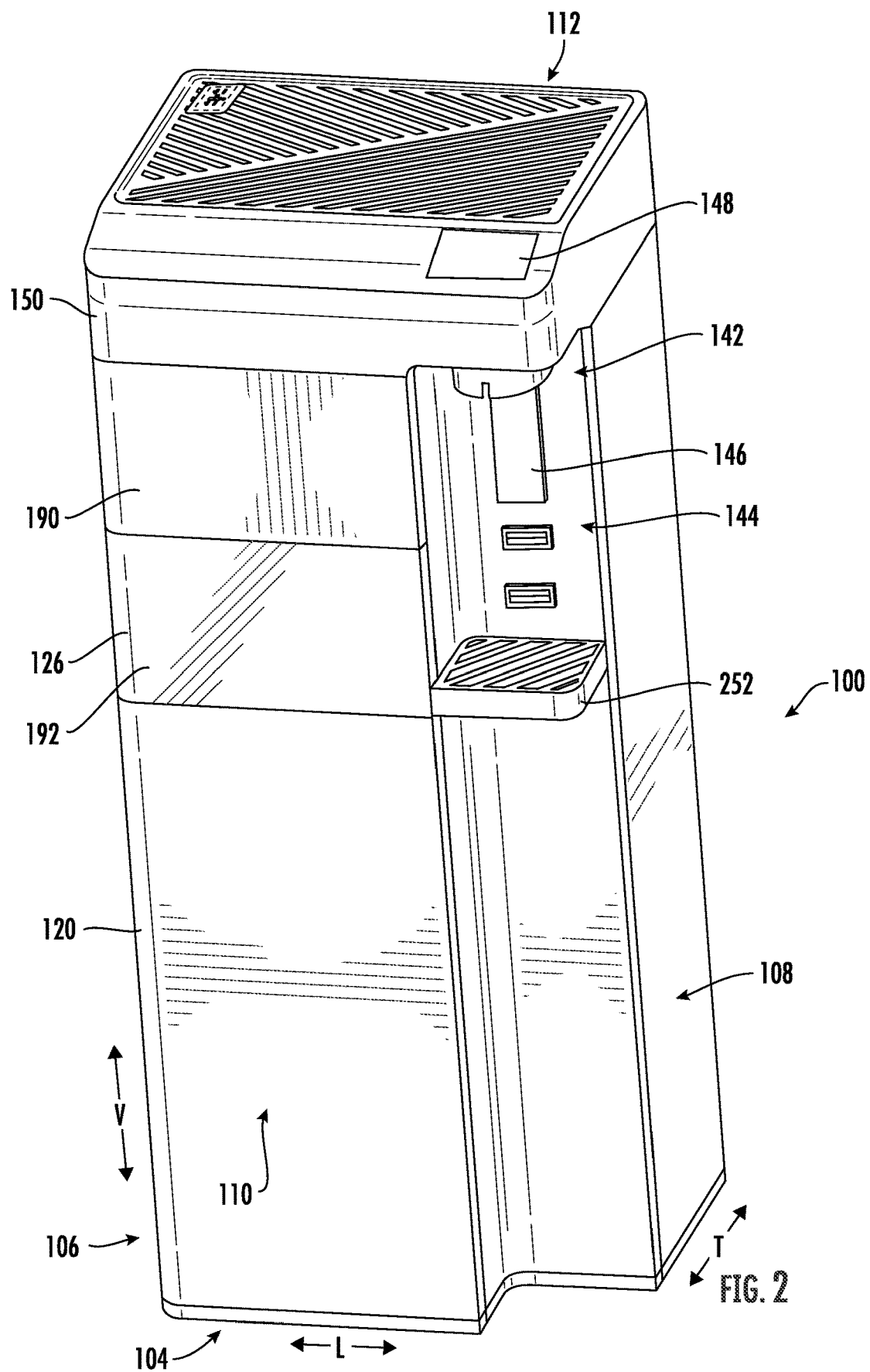
FIG. 2 provides a side perspective view of the exemplary free-standing appliance of FIG. 1.
Figure 3:
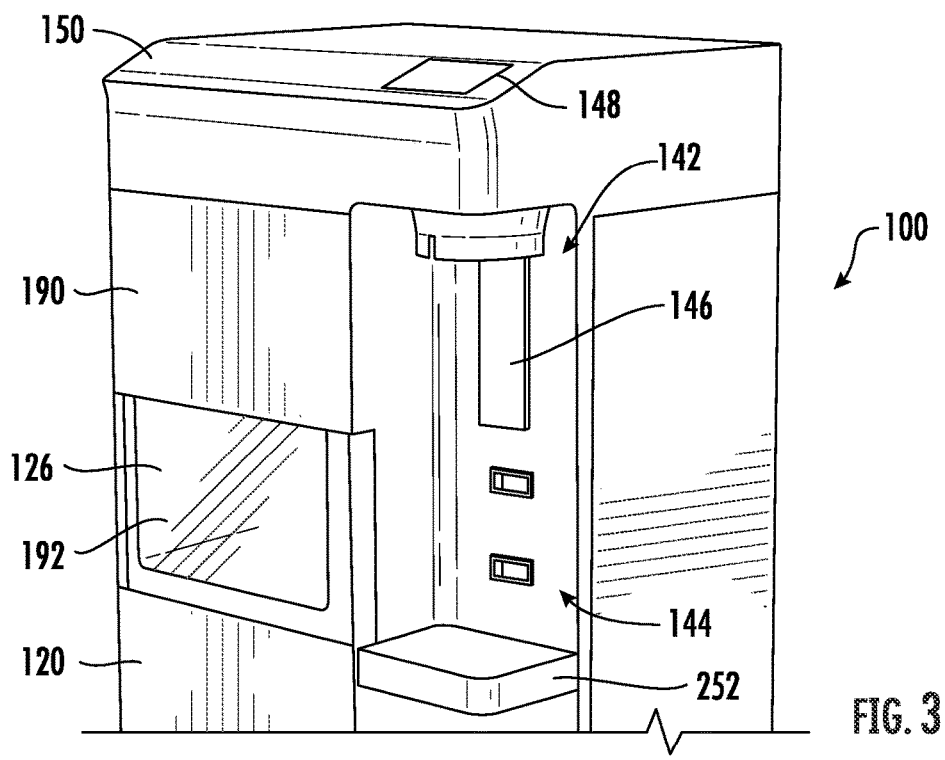
FIG. 3 provides a side perspective view of an upper portion of the exemplary free-standing appliance of FIG. 1.
Figure 4:
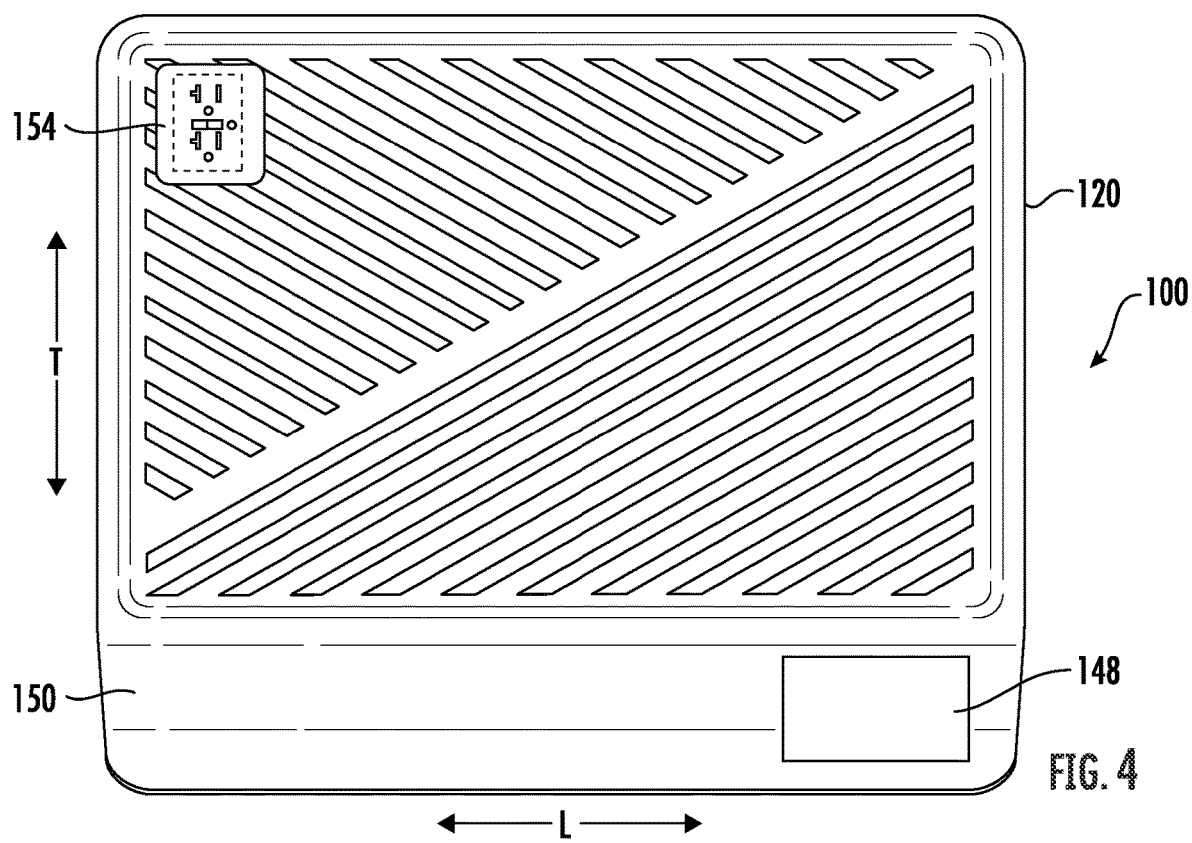
FIG. 4 provides a top plan view of the exemplary free-standing appliance of FIG. 1.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Turning now to the figures, FIGS. 1 through 9 provide various views of a free-standing appliance 100, including certain portions thereof. Generally, free-standing appliance 100 includes a cabinet or housing 120 that extends between a top 102 and a bottom 104 along a vertical direction V; between a first side 106 and a second side 108 along a lateral direction L; and between a front 110 and a back 112 along a transverse direction T. Each of the vertical direction V, lateral direction L, and transverse direction T are mutually perpendicular and thus form an orthogonal direction system.

As will be described in greater detail below, cabinet 120 supports or houses various components of free-standing appliance 100 to produce ice or dispense one more liquids (e.g., beverages) using a water source, such as a refillable internal water tank 122 (e.g., removably held within cabinet 120). For instance, an icemaker 124 may be mounted within cabinet 120 downstream from water tank 122 to receive water therefrom and form ice, which may supplied to a downstream ice bin 126 disposed within the cabinet 120. Additionally or alternatively, one or more water lines (e.g., a cold water line 130, a hot water line 132, or a carbonated water line 134) may be mounted to (e.g., within) cabinet 120 downstream from water tank 122 to selectively dispense liquid(s) from one or more corresponding outlets.

Free-standing appliance 100 includes a delivery assembly 142 for delivering or dispensing one or more liquids (e.g., from cold water outlet 136, hot water outlet 138, or carbonated water outlet 140). In some embodiments, a dispenser recess 144 is defined below one or more of the outlets 136, 138, 140. Additionally or alternatively, an actuating mechanism 146, shown as a paddle, may be mounted below the outlet(s) 136, 138, 140 (e.g., within dispenser recess 144) for operating delivery assembly 142. In alternative exemplary embodiments, any suitable actuating mechanism 146 may be used to operate delivery assembly 142. For example, delivery assembly 142 can include a sensor (such as an ultrasonic sensor) or a button rather than the paddle. In certain embodiments, a control panel 148 is provided (e.g., mounted to a top panel 150 of cabinet 120) for controlling the mode of operation. For example, control panel 148 may include a plurality of user inputs (not labeled), such as one or more buttons, knobs, or graphical user interfaces (e.g., presented on a touchscreen display) for selecting a desired mode of operation or beverage to be dispensed.

Operation of the free-standing appliance 100 can be regulated by a controller 152 that is operatively coupled to control panel 148 or various other components, as will be described below. Generally, in response to user manipulation of control panel 148 or one or more sensor signals, controller 152 may operate various components of the free-standing appliance 100. Controller 152 may include a memory and one or more microprocessors, CPUs or the like, such as general or special purpose microprocessors operable to execute programming instructions or micro-control code associated with operation of free-standing appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 152 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 152 may be positioned in a variety of locations throughout free-standing appliance 100. In the illustrated embodiments, controller 152 is located within top panel 150. In other embodiments, the controller 152 may be positioned at any suitable location within cabinet 120. Input/output ("I/O") signals may be routed between controller 152 and various operational components of free-standing appliance 100. For example, control panel 148 and delivery assembly 142 may be in communication with controller 152 via one or more signal lines or shared communication busses. Additionally or alternatively, controller 152 may be in communication with various other components of free-standing appliance 100. For example, various valves, switches, light sources, etc. may be actuatable based on commands from the controller 152. As discussed, control panel 148 may additionally be in communication with the controller 152. Thus, the various operations may occur based on user input or automatically through controller 152 instruction.

In optional embodiments, a power receptacle 154 having one or more electrical outlet plugs (e.g., standard 3-prong outlets) may be mounted to cabinet 120 (e.g., at top panel 150). An electrical device, such as a coffee grinder or phone charger, having a mating inlet plug may selectively connect and disconnect from power receptacle 154.

Although free-standing appliance 100 is not limited to any specific shape or dimensions, free-standing appliance 100 may generally be sized to fit within a fairly small room, such as an office breakroom, commercial kitchen, or in place of a so-called water cooler (i.e., fountain). Optionally, one or more casters or rollers 156 may be mounted to cabinet 120 (e.g., at the bottom 104) to support free-standing appliance 100 while permitting movement of the same.

Turning especially to FIGS. 1 and 7 through 9, icemaker 124 is provided downstream from the water tank 122 to receive water therefrom for ice making operations. Icemaker 124 may be provided as any suitable ice making assembly (e.g., for forming nugget ice, cubed ice, shaved ice, etc.). In certain embodiments, icemaker 124 includes or is provided as nugget icemaker, and in particular is an auger-style icemaker 124. Nonetheless, other suitable styles of icemakers are within the scope of the present disclosure.

As shown, icemaker 124 may include a casing 160 into which water from water tank 122 is flowed (e.g., directly from water tank 122 through one or more conduits or indirectly from water tank 122, such as through one or more intermediate storage volumes). For instance, water may be motivated by an inline pump 162 in fluid communication with water tank 122. In the illustrated embodiments, a primary line 164 from water tank 122 feeds to a downstream ice assembly line 166 (e.g., as directed by one or more valves 158, 212 or pump 162).

As would be understood, an auger may be disposed at least partially within the casing 160. During operation, the auger may rotate. Water within the casing 160 may at least partially freeze due to heat exchange, such as with a refrigeration system 172 as discussed herein. The at least partially frozen water may be lifted by the auger from casing 160. Further, in exemplary embodiments, the at least partially frozen water may be directed by the auger to and through an extruder 168. The extruder 168 may extrude the at least partially frozen water to form ice, such as nuggets of ice, as would be understood.

Formed ice may be provided by the icemaker 124 to ice bin 126 and may be received in the bin volume defined by ice bin 126. For example, ice formed by the auger or extruder 168 may be provide to the ice bin 126. In exemplary embodiments, a chute 170 may be included for directing ice produced by the icemaker 124 towards the bin volume defined by ice bin 126. For example, as shown, chute 170 is generally positioned above ice bin 126 along the vertical direction V. Thus, ice can slide off of chute 170 and drop into ice bin 126. Chute 170 may, as shown, extend between icemaker 124 and ice bin 126, and may define a passage therethrough. Ice may be directed from the icemaker 124 (such as from the auger or extruder 168) through the passage of chute 170 to the ice bin 126. In some embodiments, for example, a sweep, which may for example be connected to and rotate with the auger, may contact the ice emerging through the extruder 168 from the auger and direct the ice through the passage of chute 170 to the ice bin 126.

As discussed, water within the casing 160 may at least partially freeze due to heat exchange, such as with a refrigeration system 172. In exemplary embodiments, icemaker 124 may include a sealed system. The sealed refrigeration system 172 may be in thermal communication with the casing 160 to remove heat from the casing 160 and the interior volume thereof, thus facilitating freezing of water therein to form ice. Sealed refrigeration system 172 may, for example, include a compressor 174, a condenser 176, an expansion device 178, and an evaporator 180. Evaporator 180 may, for example, be in thermal communication with the casing 160 in order to remove heat from the casing 160 and water therein during operation of refrigeration system 172. For example, evaporator 180 may at least partially surround the casing 160. In particular, evaporator 180 may be a conduit coiled around and in contact with casing 160, such as the sidewall(s) thereof.

During operation of refrigeration system 172, refrigerant exits evaporator 180 as a fluid in the form of a superheated vapor or vapor mixture. Upon exiting evaporator 180, the refrigerant enters compressor 174 wherein the pressure and temperature of the refrigerant are increased such that the refrigerant becomes a superheated vapor. The superheated vapor from compressor 174 enters condenser 176 wherein energy is transferred therefrom and condenses into a saturated liquid or liquid vapor mixture. This fluid exits condenser 176 and travels through expansion device 178 that is configured for regulating a flow rate of refrigerant therethrough. Upon exiting expansion device 178, the pressure and temperature of the refrigerant drop at which time the refrigerant enters evaporator 180 and the cycle repeats itself. In certain exemplary embodiments, expansion device 178 may be a capillary tube or electronic expansion valve. Notably, in some embodiments, refrigeration system 172 may additionally include fans (not shown) for facilitating heat transfer to/from the condenser 176 or evaporator 180.

As noted above, ice may be received within the downstream ice bin 126. For instance, ice bin 126 may define a bin opening 182 (e.g., at the top end of ice bin 126) to permit ice therethrough. In some embodiments, a drain aperture 184 is defined at a bottom end of ice bin 126. For instance, drain aperture 184 may be defined through a base wall of ice bin 126 above a discrete melt water storage volume 186. Ice held within ice bin 126 may gradually melt. Drain aperture 184, may advantageously drain melt water away from ice bin 126. In some embodiments, one or more conduits may extend from the melt water storage volume 186 to the icemaker 124 or water tank 122. Thus, the melt water may be reused by free-standing appliance 100 to form ice. Optionally, one or more sanitizers 188 [e.g., ultraviolet (UV) light assembly or fluid filtration assembly] may be placed along the flow path from the melt water storage volume 186 to sanitize melt water before it is used to make ice or directed to another line within appliance 100.

In some embodiments, ice bin 126 is mounted (e.g., removably or fixedly) to cabinet 120 below top panel 150. A bin door 190 may be movably (e.g., rotatably or slidably) mounted on cabinet 120 to selectively permit access to the bin volume of ice bin 126. In the illustrated embodiments, bin door 190 is rotatably mounted to cabinet 120 above ice bin 126. Specifically, bin door 190 is disposed above bin opening 182 such that a user may selectively open bin door 190 and reach down to access ice within ice bin 126 though bin opening 182.

At least one wall (e.g., front sidewall 192) of ice bin 126 may be visible from outside cabinet 120. For instance, the front sidewall 192 may fit within a corresponding opening in an outer panel of cabinet 120. Additionally or alternatively, the front sidewall 192 may be formed from a clear, see-through (i.e., transparent or translucent) material, such as a clear glass or plastic, such that a user can see into the storage volume of ice bin 126 and thus view ice therein. One or more internal sidewalls 194 may extend from the front sidewall 192 and be spaced apart from an inner surface of cabinet 120.

In optional embodiments, a light source 196 is mounted within the cabinet 120. Generally, during operation, light source 196 may selectively emit or direct light into ice bin 126, illuminating any ice therein. Light source 196 may include a suitable light-emitting element, such as one or more fluorescent bulbs or light emitting diodes (LEDs). In exemplary embodiments, light source 196 is positioned above bin opening 182. For instance, light source 196 may be mounted to a bottom surface of top panel 150 above bin door 190. Along with illuminating ice bin 126 when bin door 190 is closed, light source 196 may provide illumination for a user when bin door 190 is open, such that a user can see the contents of ice bin 126.

Figure 6:
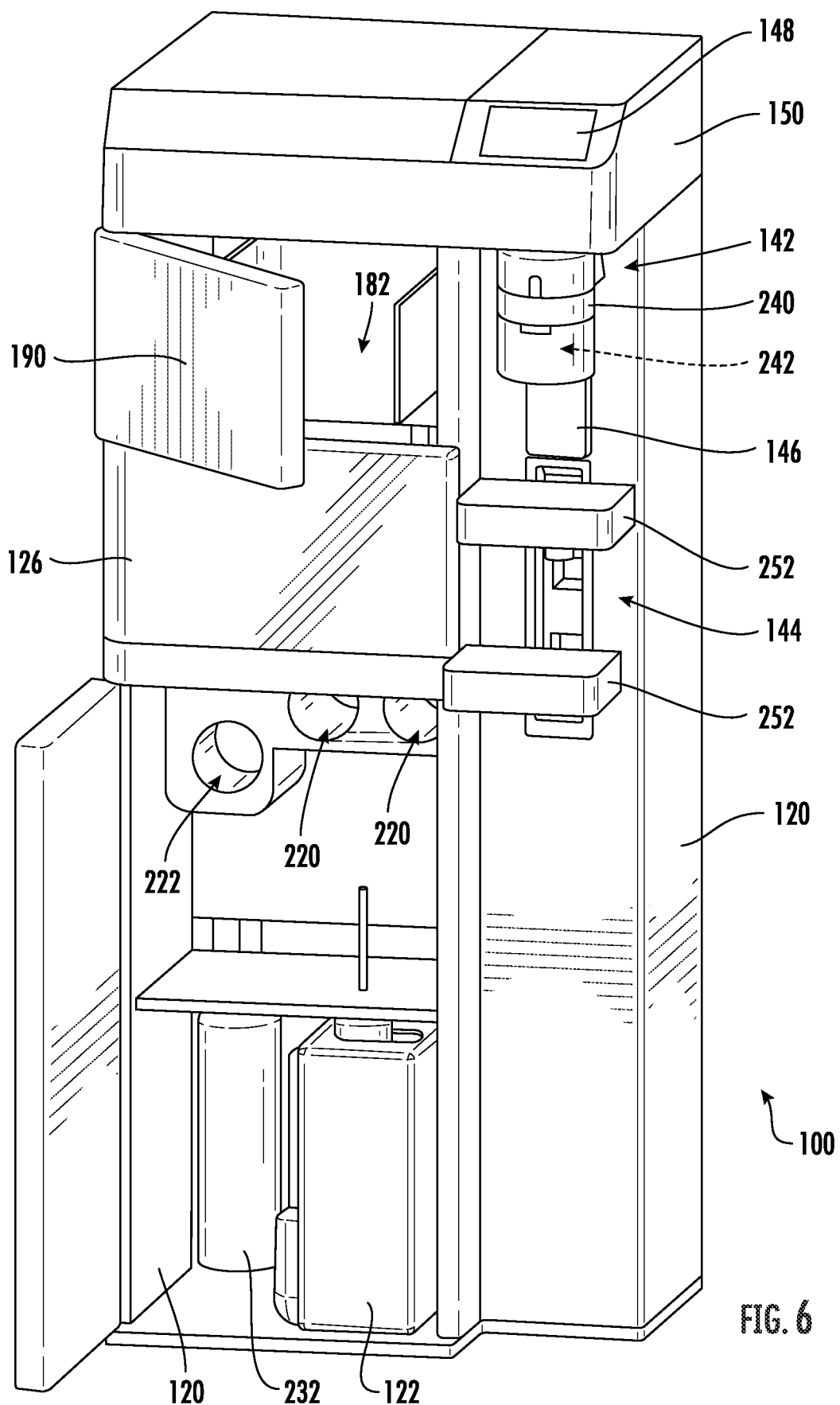
FIG. 6 provides a side perspective view of the exemplary free-standing appliance of FIG. 5, wherein multiple door have been opened for the purposes of clarity.
Figure 7:
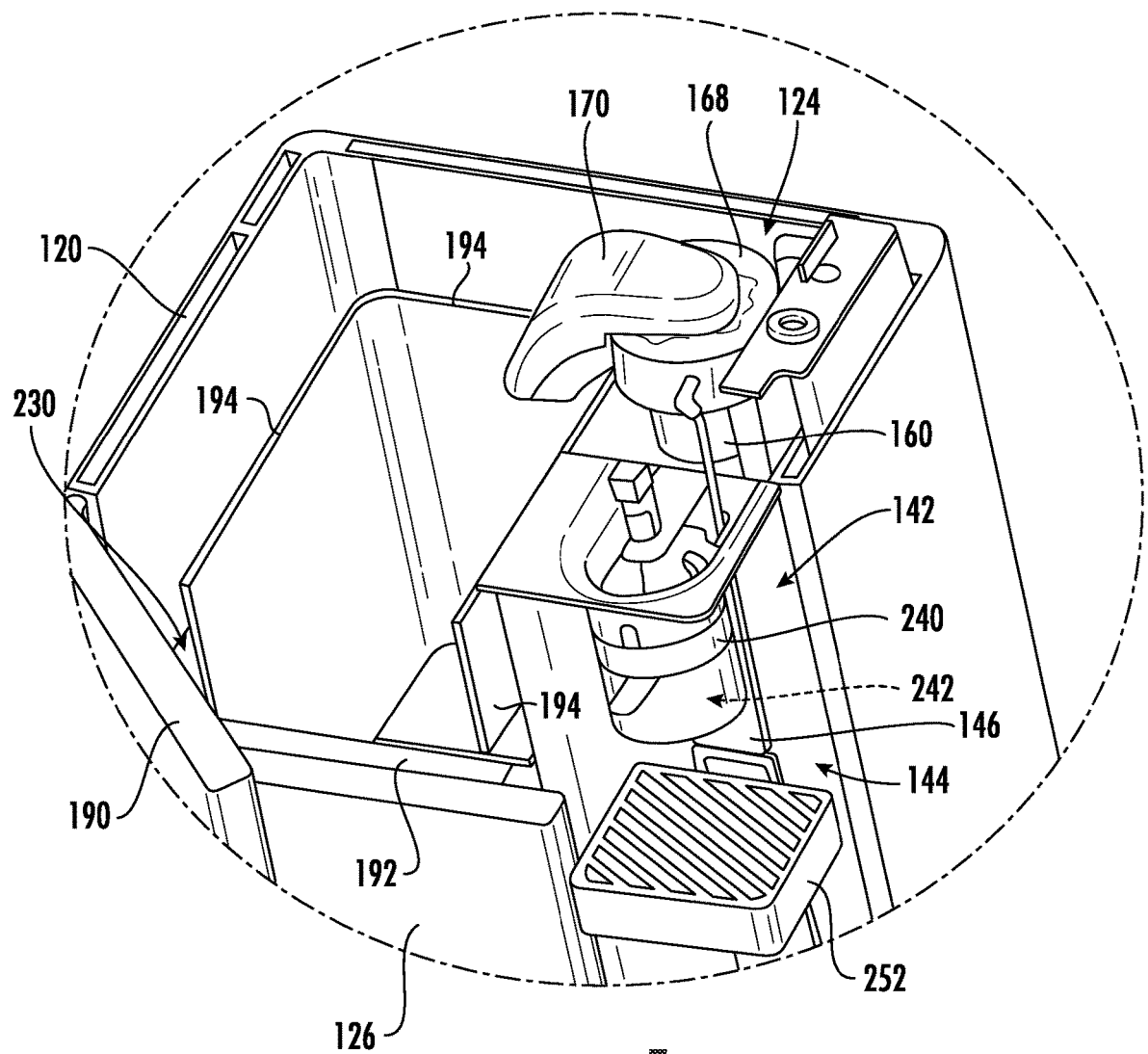
FIG. 7 provides a side perspective view of a top portion of the exemplary free-standing appliance of FIG. 6, wherein a top panel has been removed for the purposes of clarity.
Figure 8:
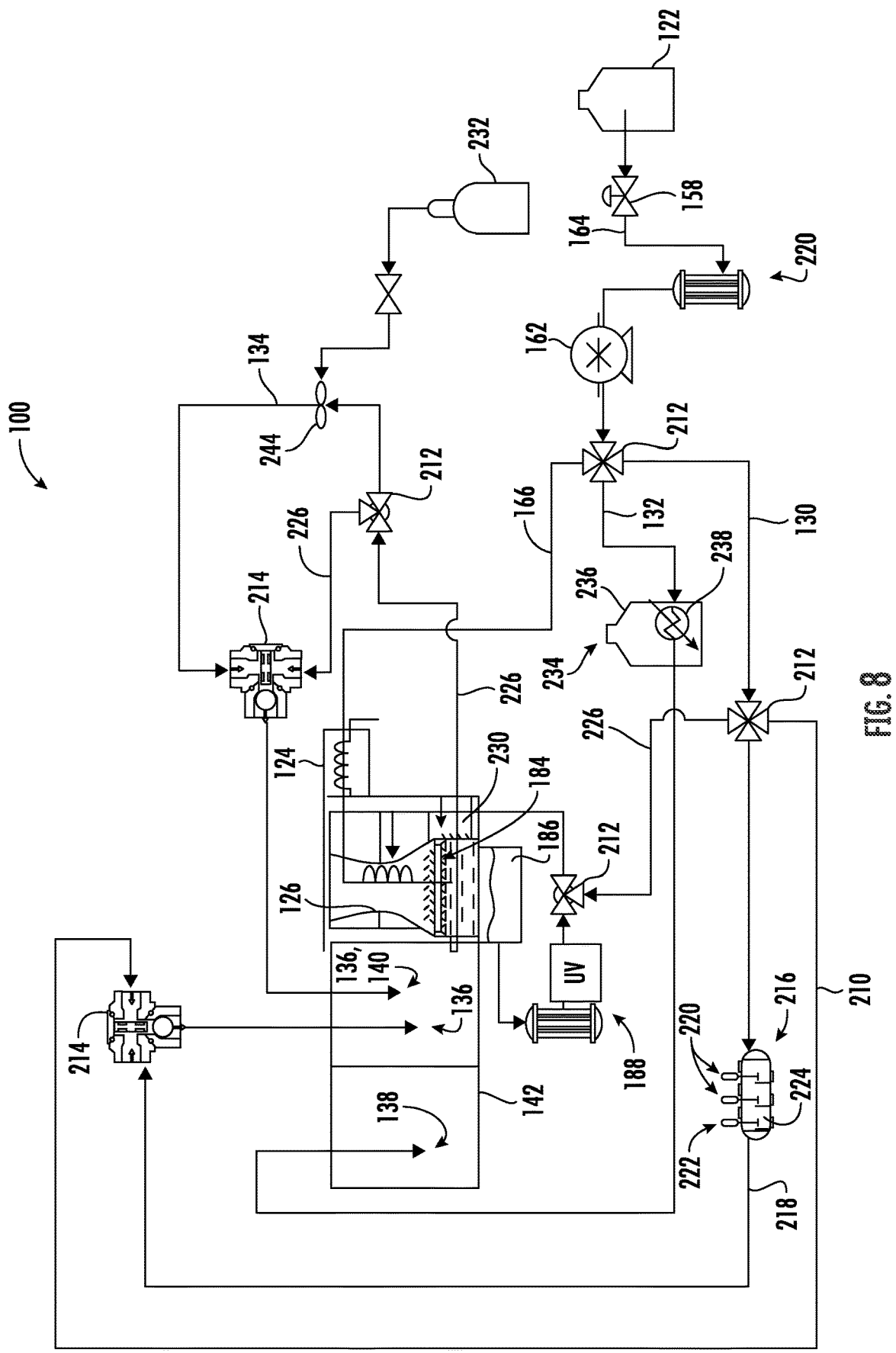
FIG. 8 provides a schematic view of the exemplary free-standing appliance of FIG. 1 illustrating the flow paths of fluids within the free-standing appliance.
Figure 9:
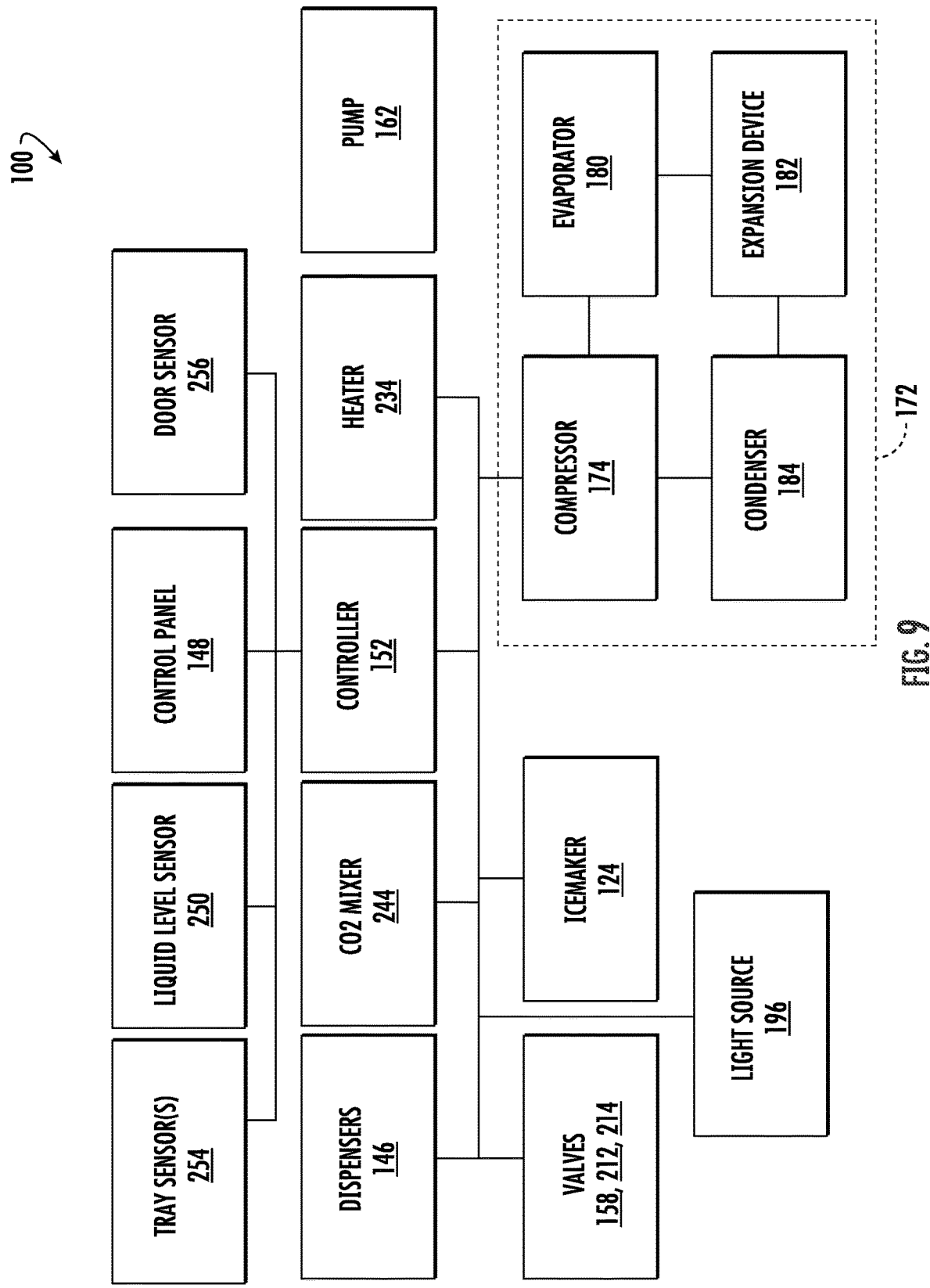
FIG. 9 provides a schematic view of the exemplary free-standing appliance of FIG. 1 illustrating various connections within the free-standing appliance.

Turning especially now to FIGS. 1, 6, and 8, one or more cold water lines 130 are provided within cabinet 120. For instance, from primary line 164, cold water line 130 may extend (e.g., along one or more parallel or connected branches) to one or more cold water outlets 136 disposed at dispenser. As shown, an untreated branch 210 of cold water line 130 may extend from a multi-path valve 212 to an outlet port 214 defining a cold water outlet 136 above dispenser recess 144. Water flowing from water tank 122 to cold water line 130 may be directed by one or more valves 158, 212 or pump 162.

In certain embodiments, a water treatment assembly 216 is provided along cold water line 130. Generally, water treatment assembly 216 may provide one or more units for filtering out or incorporating in one or more elements into water through cold water line 130. Such units may be provided in stages along a treated branch 218 of cold water line 130 (e.g., downstream of a multi-path valve 212) upstream of outlet port 214 defining a cold water outlet 136. For instance, water treatment assembly 216 may include one or more filtration stages 220 containing a filtration media (e.g., a paper filter cartridge, activated carbon, a mixed-bed media of commingled anion and cation resin, etc.). Additionally or alternatively, one or more additive stages 222 containing a water additive (e.g., electrolyte solute or mixture, flavor syrup, pH adjuster or alkaline additive, etc.) may be provided. In particular, an additive cartridge 224 holding the water additive may be selectively disposed on or received at additive stage 22. Thus, as water is flowed through at least a portion of cold water line 130 (e.g., treated branch 218), such water may be filtered or intermixed with a water additive prior to being dispensed (e.g., from a cold water outlet 136). Optionally, treated water may further mix with untreated water prior to being dispensed. For instance, untreated branch 210 and treated branch 218 may terminate at a common outlet port 214 upstream of a cold water outlet 136.

In additional or alternative embodiments, at least a portion of cold water line 130 may be chilled (e.g., to draw heat from or otherwise cool water within that portion of cold water line 130). For instance, a chilled branch 226 of cold water line 130 may be provided upstream of a corresponding cold water outlet 136 (e.g., downstream of a multi-path valve 212).

Generally, a passive or active chiller is provided along chilled branch 226. In some embodiments, a cooling jacket 230 is provided as a passive chiller to cool water within chilled branch 226. Specifically, cooling jacket 230 may define at least a portion of chilled branch 226. Moreover, cooling jacket 230 may extend along at least a portion of ice bin 126. In some such embodiments, cooling jacket 230 is disposed between one or more internal sidewalls 194 of ice bin 126 and an inner surface of cabinet 120. Specifically, cooling jacket 230 may be in conductive thermal communication with ice bin 126. Thus, heat from cooling jacket 230 (e.g., water therein) may gradually be conducted to ice bin 126 such that ice within ice bin 126 is able to cool water within cooling jacket 230. Optionally, one or more valves (e.g., multi-path valves 212) are disposed upstream from cooling jacket 230 such that a predefined volume of water may generally be held within cooling jacket 230 to ensure a steady supply of chilled water (e.g., at a cold water outlet 136).

In further additional or alternative embodiments, a carbonated water line 134 is provided downstream from water tank 122. Specifically, carbonated water line 134 may be provided in fluid isolation from a hot water line 132. In some embodiments, carbonated water line 134 is downstream of cold water line 130 (e.g., at chilled branch 226). Optionally, carbonated water line 134 terminates at an outlet port 214 defining a cold water or carbonated water outlet 140. In certain embodiments, the carbonated water outlet 140 is in fluid isolation from at least one cold water outlet 136 (e.g., even though it may alternately serve as a separate cold water outlet 136). For instance, chilled branch 226 and carbonated water line 134 may terminate at a common outlet port 214 that defines or is upstream of a cold and carbonated water outlet 136, 140.

Generally, a carbon dioxide tank 232 (e.g., mounted within cabinet 120) is disposed in selective communication with carbonated water line 134 to carbonate at least a portion of the water therein. For instance, as would be understood, a $CO_2$ mixer 244 downstream from carbon dioxide tank 232 may be selectively activated to carbonate water prior to being dispensed. Although illustrated as an in-line carbonation assembly, it is noted that a batch carbonation assembly may be provided, as would be understood.

Turning especially now to FIGS. 1 and 5 through 9, in addition to cold water line 130, one or more hot water lines 132 may be provided within cabinet 120. For instance, from primary line 164, hot water line 132 may extend to one or more hot water outlets 138 disposed at delivery assembly 142. As shown, although hot water line 132 and cold water line 130 may both be downstream from water tank 122, hot water outlet 138 may be in fluid isolation from each cold water outlet 136. Water flow from water tank 122 to hot water line 132 may be directed by one or more valves 158, 212 or pump 162.

Generally, a heating element or heater 234 is provided along the hot water line 132 to selectively heat water upstream from hot water outlet 138. In some embodiments, a heater tank 236 is disposed within cabinet 120 upstream from hot water outlet 138 (e.g., along hot water line 132). Heater tank 236 may generally define an enlarged volume that is less than that of water tank 122. Thus, a suitable volume of hot water may be held or maintained within heater tank 236. In some embodiments, heater 234 is provided as or includes an electric heater element 238 (e.g., resistive heating wire, resistive thermal element, such as a CALROD®, an inductive heating element, etc.) mounted within heater tank 236 (e.g., to selectively heat the water therein). During use, electric heater element 238 may thus be selectively activated (e.g., by controller 152) to generate or maintain a volume of water between, for instance, 160° Fahrenheit and 210° Fahrenheit.

In some embodiments, a brew module 240 is provided to aid in the generation or dispensing of one or more hot beverages. For instance, brew module 240 may define a brew chamber 242 in which a brew pod (e.g., sealed, disposable cup, or reusable mesh cup) may be received downstream from hot water outlet 138. In some embodiments, brew module 240 is mountable within dispenser recess 144 such that brew module 240 can be in fluid communication with hot water outlet 138 when mounted within dispenser recess 144. For example, when brew module 240 is installed on delivery assembly 142, an inlet of the brew module 240 may receive a water delivery tube to receive heated water therethrough. During use, heated water from the heater tank 236 may thus flow into the brew chamber 242. Within brew module 240, heated water may mix with, dissolve, or extract portions of a particulate material (e.g., held in a brew pod) to form a liquid beverage (e.g., a liquid coffee or tea solution), which may then exit brew module 240 through an outlet defined through brew module 240.

Turning now especially to FIGS. 1, 3, 5, and 6, freestanding appliance 100 may further include a liquid level sensor 250 to detect a level of liquid within a cup or container below cold water outlet 136, hot water outlet 138, or carbonated water outlet 140. In some embodiments, liquid level sensor 250 is mounted above the dispenser recess 144 to detect a height of liquid dispensed to a container from the cold water outlet 136. For instance, liquid level sensor 250 may be in communication with controller 152 and operable to measure the height of a liquid within the corresponding container. In exemplary embodiments, liquid level sensor 250 can be any suitable device for detecting or measuring distance to an object. For example, liquid level sensor 250 may be an ultrasonic sensor, an infrared sensor, or a laser range sensor. Controller 152 can receive a signal, such as a voltage or a current, from liquid level sensor 250 that corresponds to the detected presence of or distance to a liquid within the corresponding container. Based on the received signal, controller 152 can initiate or direct an auto-fill sequence. Specifically, controller 152 can determine the height of dispensed liquids within a corresponding container to ensure a predetermined level or dispensed volume is provided to the corresponding container.

Figure 5:
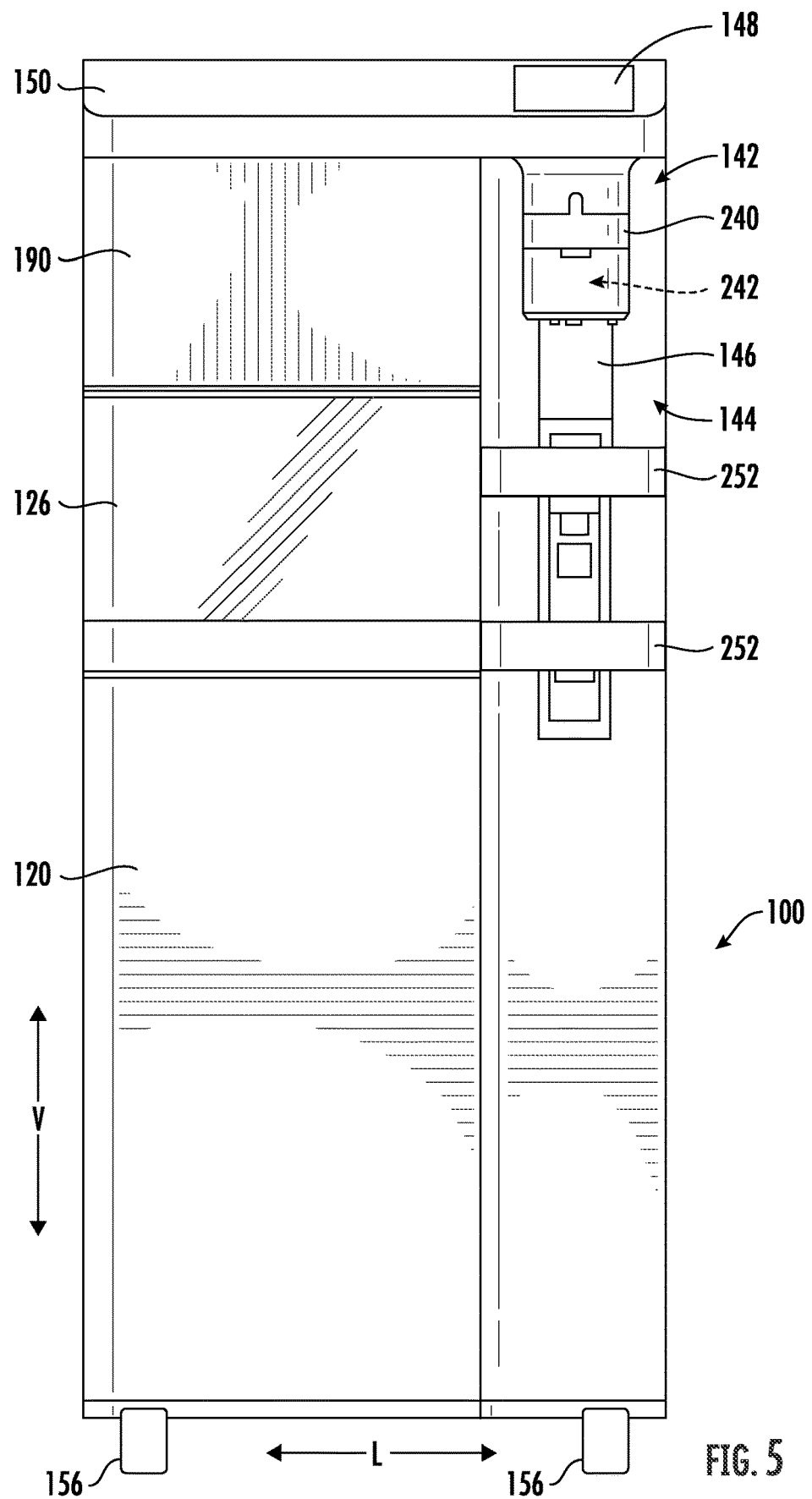
FIG. 5 provides an elevation view of the exemplary free-standing appliance of FIG. 1, wherein a removable brew module, additional tray, and roller set have been illustrated for the purposes of clarity.

In optional embodiments, liquid level sensor 250 can work in tandem with one or more other sensors to control the auto-fill sequence. As an example, in certain embodiments, a movable container tray 252 is provided to support a container below delivery assembly 142 (for the purposes of illustration, two trays 252 are shown in FIGS. 5 and 6). Movable container tray 252 may be selectively mounted to cabinet 120 at a plurality of predetermined discrete heights along the vertical direction V. For instance, each discrete height may provide or define a separate receiving index (e.g., post, recess, clip, etc.) on which movable container tray 252 may be mounted. At each discrete height a separate fixed tray sensor 254 (e.g., reed switch, Hall effect sensor, pressor sensor, etc.) may be provided to detect the presence of movable container tray 252. In some such embodiments, controller 152 may be configured to receive a signal from the fixed tray sensor 254 at which movable container tray 252 is mounted, and further direct the auto-fill sequence based on the same. For instance, controller 152 may the use the tray sensor signal to detect a distance between the movable container tray 252 and the liquid level sensor 250, and thus estimate a base height of the container that is to be filled.

As an additional or alternative example, one or more sensors may be provided to selectively halt or prevent an auto-fill sequence from proceeding. In some such embodiments, a door sensor 256 is mounted to cabinet 120 in selectively engagement with door. For instance, door sensor 256 may generally detect when bin door 190 is moved away from the closed position and transmit/halt a signal to controller 152 in response to the same. To that end, door sensor 256 may include any suitable physical detection sensor (e.g., reed switch, Hall effect sensor, pressor sensor, etc.) to selectively engage with bin door 190 in the closed position. In response to placement of the bin door 190 away from the closed position, door sensor 256 may thus transmit a door ajar signal to the controller 152. In response to receiving the door ajar signal, the controller 152 is may halt or prevent the auto-fill sequence.

Advantageously, free-standing appliance 100 supply and dispense multiple types of beverages within a relatively small or unplumbed assembly. Additionally or alternatively, one or more beverage may be efficiently generated or supplied within close proximity to generated ice (e.g., without requiring a full refrigerator appliance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A free-standing appliance comprising:
   a cabinet defining a mutually-orthogonal vertical direction, lateral direction, and transverse direction;
   a water source attached to the cabinet;
   an icemaker mounted within the cabinet downstream from the water source to receive water therefrom;
   an ice bin disposed within the cabinet downstream from the icemaker to receive ice therefrom;
   a cold water line mounted to the cabinet and defining a cold water outlet downstream from the water source in fluid isolation from the icemaker;
   a hot water line mounted to the cabinet and defining a hot water outlet downstream from the water source in fluid isolation from the cold water line;
   a carbonated water line mounted to the cabinet downstream from the water source in fluid isolation from the hot water line; and
   a carbon dioxide tank disposed within the cabinet in selective communication with the carbonated water line.

2. The free-standing appliance of claim 1, further comprising:
   a heater tank disposed within the cabinet along the hot water line; and
   an electric heater element mounted within the heater tank.

3. The free-standing appliance of claim 1, wherein the carbonated water line defines a carbonated water outlet in fluid isolation from the cold water outlet.

4. The free-standing appliance of claim 1, further comprising:
   a cooling jacket mounted along the ice bin in conductive thermal communication therewith, the cooling jacket being upstream from the cold water outlet to cool water thereto.

5. The free-standing appliance of claim 1, further comprising:
   an additive cartridge holding a water additive therein, the additive cartridge being in selective upstream fluid communication with the cold water outlet.

6. The free-standing appliance of claim 1, wherein the cabinet defines a dispenser recess below the cold water outlet and the hot water outlet, and wherein the free-standing appliance further comprises a liquid level sensor mounted above the dispenser recess to detect a height of water dispensed to a container from the cold water outlet and the hot water outlet.

7. The free-standing appliance of claim 6, further comprising:
   a movable container tray selectively received within the dispenser recess, wherein a plurality of fixed tray sensors are each mounted at discrete heights along the dispenser recess to detect a distance between the movable container tray and the liquid level sensor.

8. The free-standing appliance of claim 6, further comprising:
   a controller in operative communication with the liquid level sensor, the controller being configured to initiate an auto-fill sequence based on one or more signals received from the liquid level sensor;
   a bin door movably mounted to the cabinet in front of the ice bin to selectively permit access thereto; and
   a door sensor is mounted on the cabinet in selective engagement with the bin door to detect placement of the bin door away from a closed position, the door sensor being in operative communication with the controller to transmit a door ajar signal to the controller in response to placement of the bin door away from the closed position, wherein the controller is configured to prevent the auto-fill sequence in response to receiving the door ajar signal.

9. The free-standing appliance of claim 1, further comprising:
a bin door movably mounted to the cabinet in front of the ice bin to selectively permit access thereto.

10. The free-standing appliance of claim 1, further comprising:
a brew module defining a brew chamber and selectively received within a dispenser recess downstream from the hot water outlet.

11. A free-standing appliance comprising:
a cabinet defining a mutually-orthogonal vertical direction, lateral direction, and transverse direction, the cabinet further defining a dispenser recess;
a water tank disposed within the cabinet;
an icemaker mounted within the cabinet downstream from the water tank to receive water therefrom;
an ice bin disposed within the cabinet downstream from the icemaker to receive ice therefrom;
a cold water line mounted to the cabinet and defining a cold water outlet downstream from the water tank in fluid isolation from the icemaker, the cold water outlet being disposed above the dispenser recess;
a cooling jacket mounted along the ice bin in conductive thermal communication therewith, the cooling jacket being upstream from the cold water outlet to cool water thereto,
a liquid level sensor mounted above the dispenser recess to detect a height of water dispensed to a container from the cold water outlet;
a controller in operative communication with the liquid level sensor, the controller being configured to initiate an auto-fill sequence based on one or more signals received from the liquid level sensor;
a bin door movably mounted to the cabinet in front of the ice bin to selectively permit access thereto; and
a door sensor is mounted on the cabinet in selective engagement with the bin door to detect placement of the bin door away from a closed position, the door sensor being in operative communication with the controller to transmit a door ajar signal to the controller in response to placement of the bin door away from the closed position,
wherein the controller is configured to prevent the auto-fill sequence in response to receiving the door ajar signal.

12. The free-standing appliance of claim 11, further comprising:
a hot water line mounted to the cabinet and defining a hot water outlet downstream from the water tank in fluid isolation from the cold water line;
a heater tank disposed within the cabinet along the hot water line; and
an electric heater element mounted within the heater tank.

13. The free-standing appliance of claim 11, further comprising:
a carbonated water line mounted to the cabinet downstream from the water tank in fluid isolation from the cold water line; and
a carbon dioxide tank disposed within the cabinet in selective communication with the carbonated water line.

14. The free-standing appliance of claim 11, further comprising:
an additive cartridge holding a water additive therein, the additive cartridge being in selective upstream fluid communication with the cold water outlet.

15. The free-standing appliance of claim 11, further comprising:
a movable container tray selectively received within the dispenser recess, wherein a plurality of fixed tray sensors are each mounted at discrete heights along the dispenser recess to detect a distance between the movable container tray and the liquid level sensor.

16. The free-standing appliance of claim 11, further comprising:
a bin door movably mounted to the cabinet in front of the ice bin to selectively permit access thereto.

17. The free-standing appliance of claim 12, further comprising:
a brew module defining a brew chamber and selectively received within the dispenser recess downstream from the hot water outlet.

18. A free-standing appliance comprising:
a cabinet defining a mutually-orthogonal vertical direction, lateral direction, and transverse direction, the cabinet further defining a dispenser recess;
a water source attached to the cabinet;
an icemaker mounted within the cabinet downstream from the water source to receive water therefrom;
an ice bin disposed within the cabinet downstream from the icemaker to receive ice therefrom;
a cold water line mounted to the cabinet and defining a cold water outlet downstream from the water source in fluid isolation from the icemaker, the cold water outlet being disposed above the dispenser recess;
a hot water line mounted to the cabinet and defining a hot water outlet downstream from the water source in fluid isolation from the cold water line, the hot water outlet being disposed above the dispenser recess;
a carbonated water line mounted to the cabinet downstream from the water source in fluid isolation from the hot water line;
a liquid level sensor mounted above the dispenser recess to detect a height of water dispensed to a container from the cold water outlet and the hot water outlet;
a movable container tray selectively received within the dispenser recess; and
a plurality of fixed tray sensors each mounted at discrete heights along the dispenser recess to detect a distance between the movable container tray and the liquid level sensor.

19. The free-standing appliance of claim 18, further comprising:
a cooling jacket mounted along the ice bin in conductive thermal communication therewith, the cooling jacket being upstream from the cold water outlet to cool water thereto.

20. The free-standing appliance of claim 18, further comprising:
a movable container tray selectively received within the dispenser recess, wherein a plurality of fixed tray sensors are each mounted at discrete heights along the dispenser recess to detect a distance between the movable container tray.

* * * * *